March 14, 1967  J. B. GARRISON  3,309,700
RADAR SEARCH SYSTEM
Filed March 18, 1963  4 Sheets-Sheet 1

JOHN B. GARRISON
INVENTOR

BY Claude Funkhouser
ATTORNEY

John B. Garrison
INVENTOR

March 14, 1967  J. B. GARRISON  3,309,700
RADAR SEARCH SYSTEM
Filed March 18, 1963  4 Sheets-Sheet 3

John B. Garrison
INVENTOR

BY Claude Funkhouser
ATTORNEY

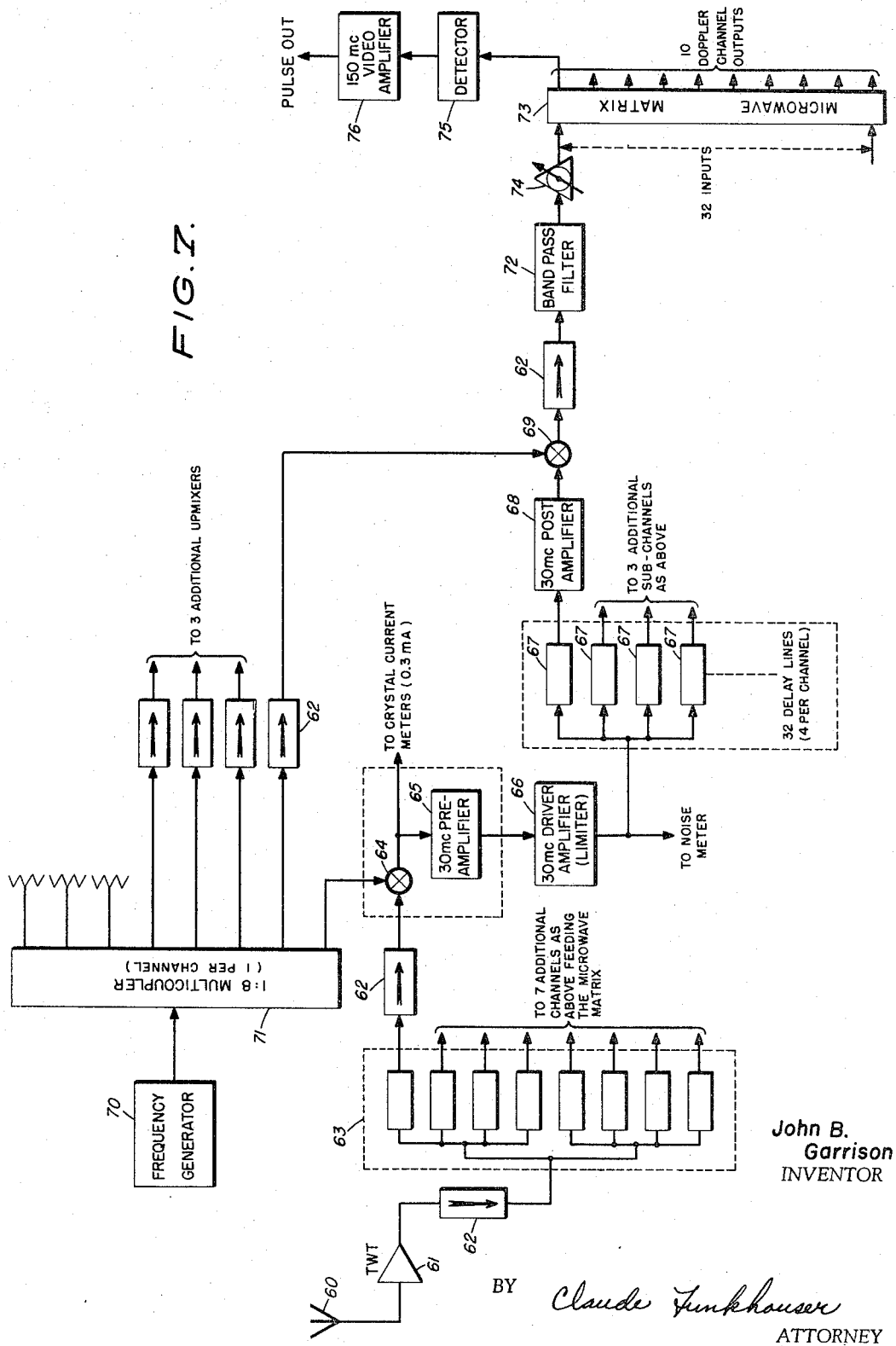

United States Patent Office 3,309,700
Patented Mar. 14, 1967

3,309,700
RADAR SEARCH SYSTEM
John B. Garrison, Silver Spring, Md., assignor to the United States of America as represented by the Secretary of the Navy
Filed Mar. 18, 1963, Ser. No. 266,113
10 Claims. (Cl. 343—8)

The present invention relates in general to radar systems and more particularly to a target search and acquisition system designed for use with a radar utilizing frequency diversity pulse Doppler techniques.

The present invention was designed for use in a complex weapons system of which the radar system described and illustrated in patent application Ser. No. 20,231, filed Apr. 5, 1960, John B. Garrison, inventor, assigned to the U.S. Government (Navy Case No. 29973), is a component part. The overall weapons system provides for simultaneous multiple target tracking and weapon guidance and utilizes a high powered spherically symmetric multiple beam radar system which provides for multiple control and extremely rapid beam shifting. Countermeasures problems are met by designing the system with such characteristics as frequency diversity, Doppler discrimination, and high power. The pulse repetition frequency (PRF) may be fixed, pre-programmed or randomly jittered, the transmit and receive beams can be pointed in any direction in the hemisphere within a few microseconds, and the radiated power may be divided among search, track-while-scan, and target tracking in any proportion.

The present invention consists of the search-acquisition portion of the above-described weapons system. The requirement for a short system reaction time in the integrated radar-missile system is extremely critical and quite difficult to attain. One of the major difficulties with present systems is the slow search-track transfer. If the tracking system is of the pulse Doppler type and a wide range of target velocities is anticipated, it is desirable that the search system determine at least the approximate radial velocity of the target. The magnitude of this problem becomes apparent when in considering typical coverage and resolution parameters for such a system, it is found that there are several billion range Doppler bins in the hemisphere. Conventional pulse-Doppler techniques are impractical for such a determination.

It is therefore an object of the present invention to provide a target search and acquisition system, for use with a radar of the type described, that is capable of simple conversion from the search mode of operation into a track or track-while-scan mode.

It is another object of the invention to provide a radar search and acquisition system whose operation is based on frequency diversity and pulse compression techniques.

It is a further object of the invention to provide a radar search and acquisition system which will produce high sub-clutter signal visibility.

It is still another object of the invention to provide a radar search and acquisition system which possesses extremely effective target discrimination capabilities, has no range pulse ambiguities comparable to the signal level, and has no blind speeds in the expected Doppler range.

It is still a further object of the invention to provide a radar search and acquisition system operating on frequency diversity from pulse to pulse and a continuously variable pulse repetition frequency wherein the pulse compression ratio produced is of a much higher value than that obtainable with radar systems in use up to the present time, with the result that the time/bandwidth product will be improved by several orders of magnitude.

Other objects and many of the attendant advantages of this invention will be readily appreciated as the same becomes better understood by reference to the following detailed description when considered in connection with the accompanying drawings, wherein:

FIG. 7 is a schematic diagram of the preferred embodiment of the invention capable of acquisition of eight frequency Doppler signals.

Figure 1:
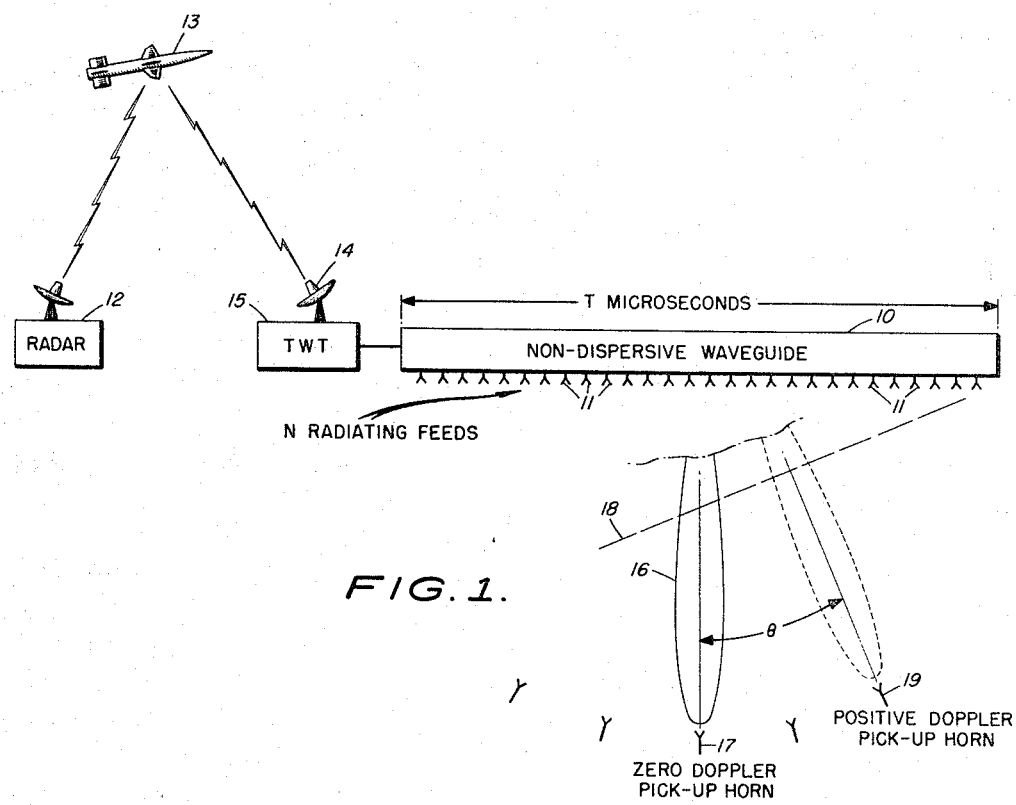
FIG. 1 is a schematic diagram of a system illustrating the basic principles of the invention.

In order to utilize fully the inherent capabilities of the radar system briefly mentioned above for target acquisition it is necessary to make use of the same frequency diversity techniques in the search system that are employed for tracking, and to have coherent operation and a continuously variable pulse repetition frequency.

The basic theory of operation of the invention will be explained in connection with the schematic diagram of FIG. 1 wherein a long wideband microwave delay line 10 in the form of a length of waveguide is provided with a plurality of radiating feeds 11 so that the delay line serves as a long linear antenna. If now a standard radar 12 transmits a series of short pulses whose time spacing is matched to the spacing of the feeds 11 on the microwave delay line 10, and the signals are reflected off of a stationary point target 13, the return pulses after being received by a standard radar antenna 14 and fed through an amplifier 15 to delay line 10, will align themselves at their corresponding feeds 11 on delay 10 at a given instant of time. If the transmitted pulses are samples of a stable single frequency source, a beam 16 will be formed perpendicular to the delay line antenna 10 for the duration of the pulse since the target 13 is stationary. The phase front across the antenna 10 for all of the pulses will be linear and this will be true regardless of the frequency of the transmitted signal if the distance to each feed is an integral number of wavelengths of the transmitted frequency. A pickup horn 17 placed perpendicular to the linear array and out of the near zone will pick up the pulse for this target. In the case where discrete multiple frequencies are to be used and these frequencies are integral multiples of a basic frequency $f_0$, then by choosing the spacing of the feeds 11 to be an integral multiple of the wavelength corresponding to $f_0$, a fixed set of radiating elements can be used for a multiplicity of input frequencies. The advantages connected with the use of multiple frequency transmission will be discussed in greater detail as this description proceeds.

In accordance with known Doppler principles a moving target will shift the phase of a succession of reflected pulses in a linear fashion. If the target 13 shown in FIG. 1 is a moving target, the phase front of the return pulses across the antenna 10 will no longer be linear but will take the appearance shown by dotted line 18. The angle $\theta$ at which the beam points will be proportional to the radial velocity of the target; therefore, a pickup horn 19 placed at angle $\theta$ from pickup horn 17 will detect signals for that particular radial speed, independent of the transmitted RF frequency. If a large number of pickup horns are placed at different angles $\theta$ from pickup horn 17 so that a horn is provided for each expected target velocity, the determination of target velocity is reduced to finding the horn which contains an output signal. Positive Dopplers will appear at the horns on one side of zero Doppler horn 17 and negative Dopplers will appear at the horns on the other side. The Doppler resolution for this type of system is inversely proportional to the length of the delay line and the angle at which the beam points is given by $$\sin \theta = 2vT/d$$

where $v$ equals the target radial velocity, $T$ is the dwell time of the delay line and $d$ is the physical length of the delay line.

What has been described up to this point is a single frequency pulse Doppler technique using fixed pulse repetition frequency radar and feed spacing equal to the interpulse spacing. However, with the parameters described, range ambiguities will occur every $T/n$ microseconds where $n$ is the number of feeds 11 on delay line 10. The ambiguities result since the pulse pattern in the delay line repeats every interpulse period; yet, true range data is obtained only when the pulse pattern is such that the pulses align with their corresponding feeds 11. This ambiguity problem can be minimized by staggering the pulse transmission and adjusting the feeds on the delay line 10 in a corresponding manner. However, a better solution to this range ambiguity problem and one which forms part of the invention is the incorporation into the system of frequency diversity.

Frequency diversity gives an interesting result in that a pulse compression is obtained from point source targets. As has been explained in conjunction with FIG. 1, the angle that the beam points due to a moving target is independent of frequency. If the radar 12 transmits a signal which varies in frequency from pulse to pulse, the output of the delay line antenna 10 at the proper Doppler pickup horn will consist of a summation of many frequencies occurring over the interval of the duration of a pulse.

If the generation of the pulses is restricted to samples of a multifrequency coherent signal generator, these frequencies will be equally spaced and equal in amplitude. Coherent frequencies are frequencies that are so related in phase that the phase difference of successively transmitted pulses is known or may be readily determined. If they are then summed together and properly phased, the resultant summation will peak in amplitude periodically. The period of these peaks is the inverse of the spacing between the adjacent frequencies $(1/\Delta f)$ and the width of the peak is the inverse of the overall bandwidth of the signal generator and equals $(1/m\Delta f)$ where $m$ equals the number of frequencies. It can now be seen that if all the samples are delayed in the microwave delay line by an integral number of wavelengths, the same peaking or pulse compression will occur at the proper pickup horn with a complete elimination of range ambiguities. The compression ratio of this type of system is extremely high since there are $n$ pulses, each of which is compressed by $m$. The result is an extremely high time bandwidth product, which is a measure of quality of modern radar systems.

The system described in conjunction with FIG. 1 is not practical for at least two reasons. First of all, for the resolution and frequencies involved the delay line 10 would have to extend for many miles to produce the required delays. Secondly, the use of a large number of pickup horns and their position outside of the near zone of the delay line antenna 10 would result in a very cumbersome system. As a result, the implementation of the system according to the invention incorporates special techniques while preserving the overall theory of operation in accordance with the teachings of the invention.

Figure 2:
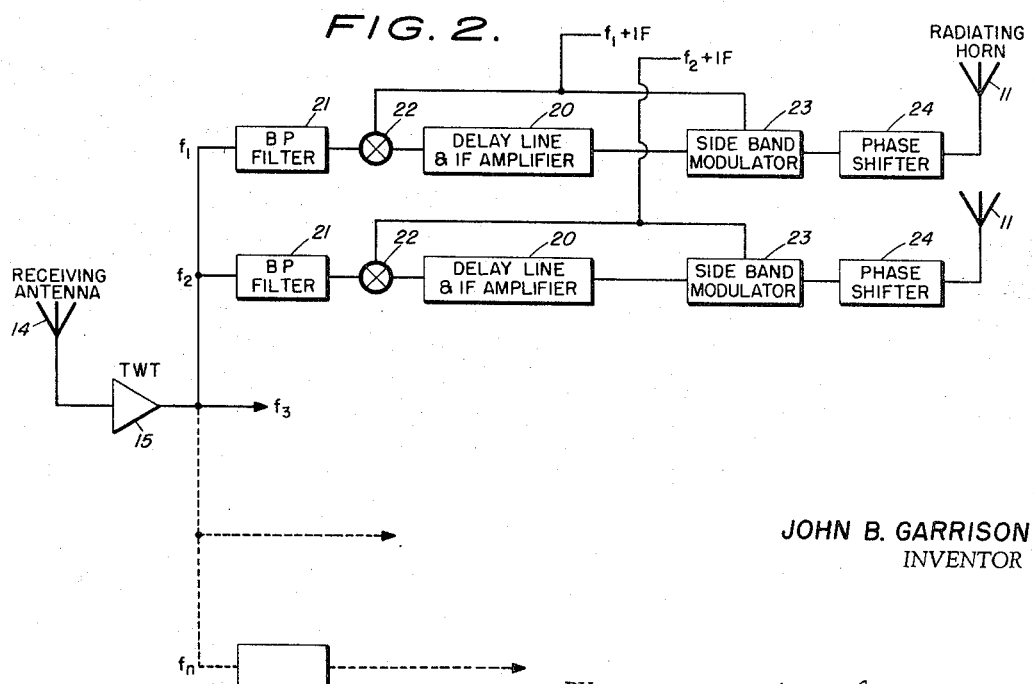
FIG. 2 is a schematic block diagram of a portion of the invention incorporating some of the features of the system of FIG. 1.

The basic system incorporating one of these techniques is shown in FIG. 2. The waveguide delay line antenna is replaced by a plurality of individual ultrasonic delay lines 20. The receiving antenna 14 passes the incoming signal to low noise traveling wave tube 15 where it is amplified and passed on to a plurality of parallel connected filter channels $f_1$ through $f_n$ each containing a bandpass filter 21 tuned to one of the coherent transmitted frequencies. Following the filter 21 in each channel is a mixer 22, delay line 20, a modulator 23, a phase shifter 24 and a radiating feed 11.

For purposes of explanation of the operation of the system of FIG. 2, let the first transmitted pulse in a given dwell be a sample of frequency $f_1$. After the corresponding echo has been received from the target and amplified in a low noise traveling wave tube 15, it passes through the filter 21 in the first channel $f_1$. It is then mixed with a convenient local oscillator signal in mixer 22 to pass it through the ultrasonic delay line 20. The time delay in the delay line 20 in channel $f_1$ is $(T-t_1)$ where $t_1$ is the time of transmission of the first pulse after the start of dwell period. From the delay line 20, the IF pulse is passed on to modulator 23 where it is used to modulate the same local oscillator signal which was used for the mixer 22. The output of modulator 23 is a pulse on frequency $f_1$ which has been delayed a fixed number of wavelengths. The delay line 20 need be accurate in length only to a fraction of the pulse length since the final phase shifter 24 in each channel is used as a vernier to adjust the delay to an integral number of wavelengths for each channel.

In a similar manner, the $n$th pulse is transmitted at time $t_n$ on frequency $f_n$. It is passed by filter 21 in channel $f_n$; mixed in mixer 22 with a local oscillator signal, delayed in delay line 20 by $(T-t_n)$, and mixed back to $f_n$ in modulator 23. Phase is preserved along with amplitude in all channels and the filter in each channel determines the noise bandwidth in that channel and removes the image. Thus, the pulse on each channel at the output of each phase shifter 24 is a delayed replica of each transmitted pulse and a phase modulation of the pulses due to Doppler shift will cause a shift in the phase front from antenna feeds 11. The preceding explanation holds true for a transmitted signal having a constant pulse repetition frequency. Obviously, if the pulse repetition frequency is varied as is intended by the invention, the delay of each of the delay lines 20 will have to be adjusted accordingly for each transmitted pulse in order to make the necessary pulse compression possible. The manner in which the pulse repetition frequency is varied and the delay of delay lines 20 is correspondingly determined will be explained in greater detail below.

Figure 3:
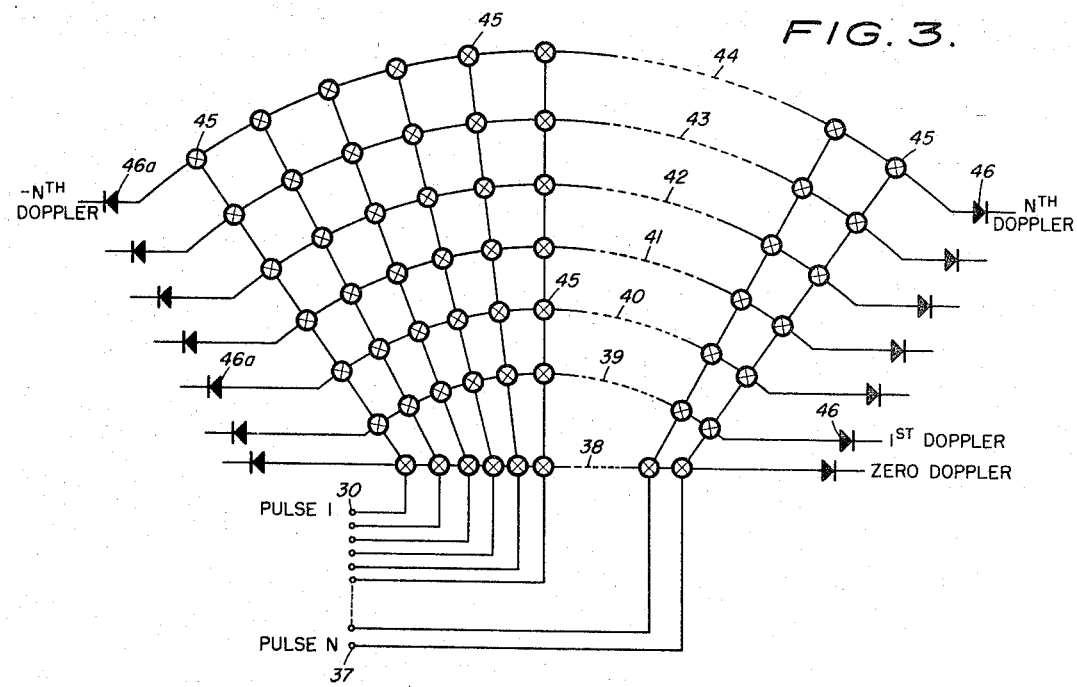
FIG. 3 is a diagram of a microwave matrix to be used as a Doppler computer in conjunction with the system of FIG. 2.

The pulses in the output of phase shifters 24 could be fed to a linear set of feeds 11 similar to the arrangement shown in FIG. 1, however, this would be a cumbersome arrangement since the pickup horns would have to be remotely located from the feeds. A more practical arrangement is to feed the pulses into a microwave matrix such as shown in FIG. 3. The output pulses from the channels $f_1$ through $f_n$ are fed into the matrix at input lines 30 through 37 respectively. The matrix consists of a plurality of output Doppler lines 38 through 44, which are coupled to each input line 30 through 37 by a signal coupler 45. A small portion of each signal from the individual channels is coupled to each of the lines 38 through 44 and the line lengths between each of the couplers 45 is such that there is an equal number of wavelengths between each input and an output diode detector 46. Thus, a small portion of each signal is coupled into zero Doppler arm 38 which has its couplers arranged to compensate for the time between transmitted pulses. If there is no Doppler component in the incoming signal, the pulses will be in proper phase in line 38 at diode 46 to produce a compressed pulse output. However, it can be seen from the geometry of the matrix that the arc length in each of the lines 39 through 44 between the couplers 45 is greater than in the line 38. The first received pulse will have a greater time delay than the last one before it gets to the detector in each given line. This increase between couplers in each of the lines 39 through 44 is comparable to a different given Doppler phase shift produced by a moving target so that each line will detect a particular Doppler frequency. Within a given range of Doppler frequencies, there will be one line in which the couplers will be properly spaced so that the pulses introduced into the matrix will compress to produce an output pulse. In addition the matrix is set up so that the detectors 46 on one side of the matrix detect positive Dopplers and detectors 46a on the other side of the matrix detect negative Dopplers. The matrix shown in FIG. 3 is a constant velocity matrix. A constant acceleration matrix based on similar principles is also possible and can be used in the same manner as the matrix shown.

Figure 4:
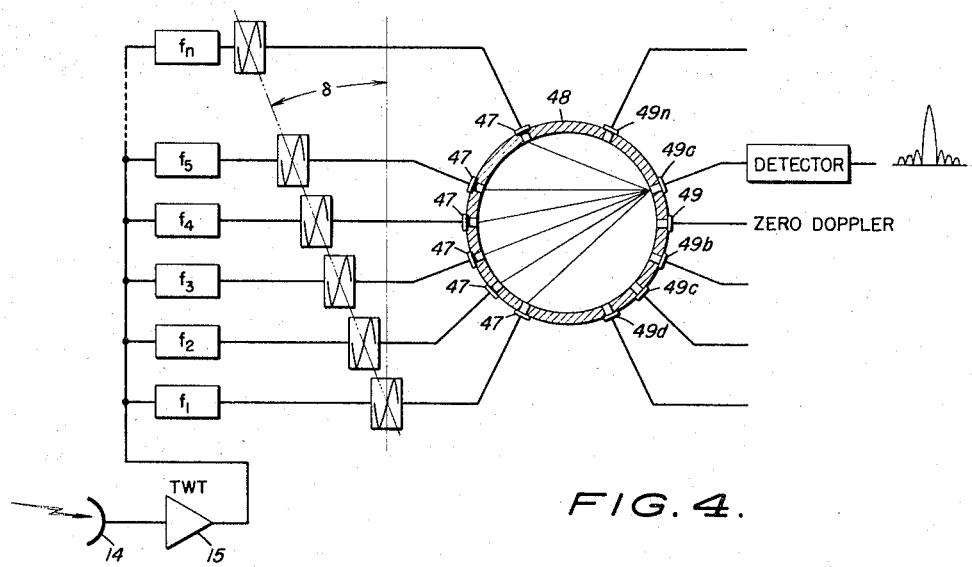
FIG. 4 is a schematic diagram of a second form of Doppler computer which may be used in conjunction with the system of FIG. 2.

In addition to the microwave matrix just described, a microwave lens of the type disclosed in U.S. application Ser. No. 33,028, filed Apr. 13, 1962, now abandoned, for "Computer Lens," Theodore C. Cheston, inventor, may be used to focus and compress the received pulses in the desired manner. A schematic representation of the microwave lens and its association with the remainder of the system according to the invention is illustrated in FIG. 4. Transmitted pulses are reflected from the target, received at antenna 14, amplified in traveling wave amplifier 15 and separated according to transmitted frequency in channels $f_1$ through $f_n$ in the manner described in conjunction with FIG. 2. The waveform at the output of each channel, as shown on each associated line, indicates the presence of a Doppler shift in the return pulses. These pulses are applied to input feeds 47 on lens 48.

As indicated in the above-mentioned copending application Ser. No. 33,028 the microwave lens 48 is constructed so as to receive a plane wave at its input feeds and to focus this wave to a single output feed located on the opposite side of the lens at a point defined by the intersection with the lens of a line passing through the center of the lens and the point of tangency of the plane wave with the lens. Thus, the lens has a beam bending property which continuously adjusts the phase and amplitude of the injected pulses and maintains their phase relationship so as to provide a compressed pulse at one of the output feeds on the opposite side of the lens.

If all of the pulses in the output lines from the channel $f_1$ through $f_n$ were in phase, as in a plane wave, the lens would focus these pulses to output feed 49 and would thereby indicate a zero Doppler. However, if the pulses on the output lines from channels $f_1$ through $f_n$ were out of phase with each other, as shown in FIG. 4, the lens 48 would treat the pulses as if they had been received by the lens at that particular phase angle $\delta$ and would focus these pulses to a single output feed 49a, which is located at a point on the opposite side of the lens defined by the intersection with the lens of a line perpendicular to the incoming phase front and passing through the center of the lens. And since output feed 49a is the only feed which will receive the applied pulses in phase, this feed will be the only one to produce a compressed output pulse. As the angle of the phase front of the applied pulse changes, a different output feed will detect a compressed pulse and in that way different values of Doppler can be determined on either side of zero Doppler. It should be understood that the illustration of the lens 48 in FIG. 4 is schematic and that many more output feeds than shown would actually be used.

Figure 5:
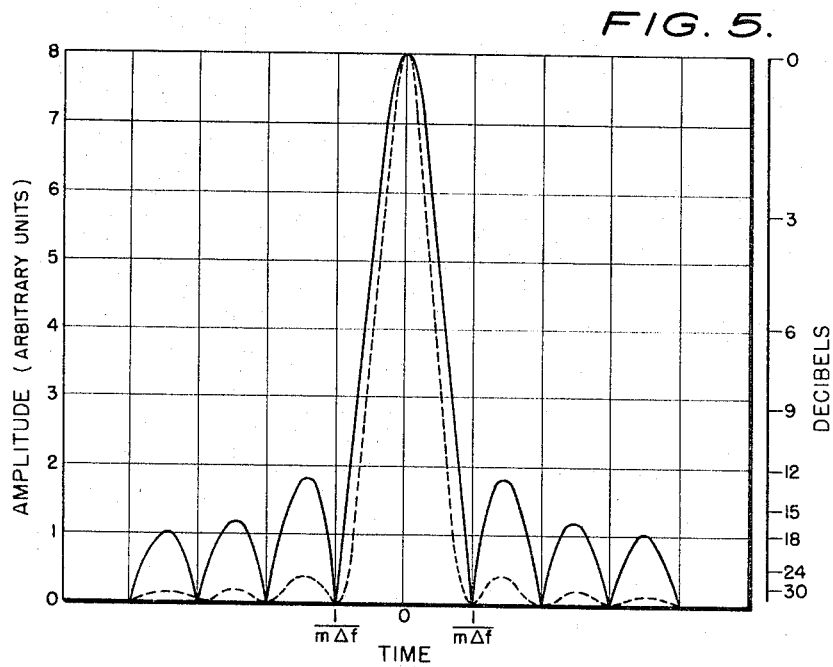
FIG. 5 is an illustration of the waveform output from either of the systems of FIGS. 3 or 4 for the case of eight transmitted frequencies.

The envelope of the compressed output pulse has the form shown in FIG. 5 for eight transmitted frequencies. The squared output curve is shown in dotted line and is the one which is obtained at the output of the matrix detectors 46 and 47 since the diodes are operating in their square-law region. The solid line curve represents the compressed output pulse after linear detection. With equal amplitude pulses from all channels, the first sidelobes of the compressed pulse waveform are 13 db down before the detection, and 26 db down after square-law detection. Additional sidelobe suppression of the waveform can be obtained by tapering the amplitude of the inputs to the matrix, tapering the matrix attenuation, or summing adjacent outputs of the matrix. The summing of adjacent outputs gives a Doppler channel which is halfway between the two summed channels and is called the inner-Doppler. This channel is sometimes useful in Doppler interpretation. Slidelobe suppression increases the width of the compressed pulse by a small amount in a direct analogy to the sidelobe suppression of the radiation pattern of an antenna array.

The invention as a whole can be considered a matched filter since a system output is only obtained when the delay lines and filters in the receiver are matched to the received pulse train timing and frequencies. It is known that matched filter techniques offer such advantages over simple bandpass radars as increased signal-to-noise ratio and increased subclutter visibility. The degree of improvement, however, is dependent upon the selection of the matched signal to be transmitted. The most optimum binary-type matched signal to transmit is one which is or contains a pseudo-random code.

One method of generating these pseudo-random codes is by means of a linear maximal-length shift register. A linear maximal-length shift register is an $n$ stage register that will shift through all of its $2n-1$ states (excluding the zero state) in a pseudo-random fashion by properly arranging feedback from some of the $n$ outputs through a half-adder to the input. The resultant codes are called pseudo-random because of their nearly equal numbers of 0's and 1's, pairs of 0's and 1's, triplets of 0's and 1's, etc.

One embodiment of a programmed transmitter using such feedback shift register to produce a random code for varying the repetition rate and frequency of a transmission from pulse to pulse is illustrated and described in U.S. patent application Ser. No. 266,112, by F. E. Nathanson and D. M. White, filed Mar. 18, 1963. A brief description of this programmer will be made in conjunction with FIG. 6. The system as shown is designed to provide 32 transmitted pulses in a prescribed dwell period. Each of these transmitted pulses is displaced from its basic spacing by adding varying amounts of delay thereto. The transmitted frequency is also diversified from pulse to pulse over eight frequencies.

Figure 6:
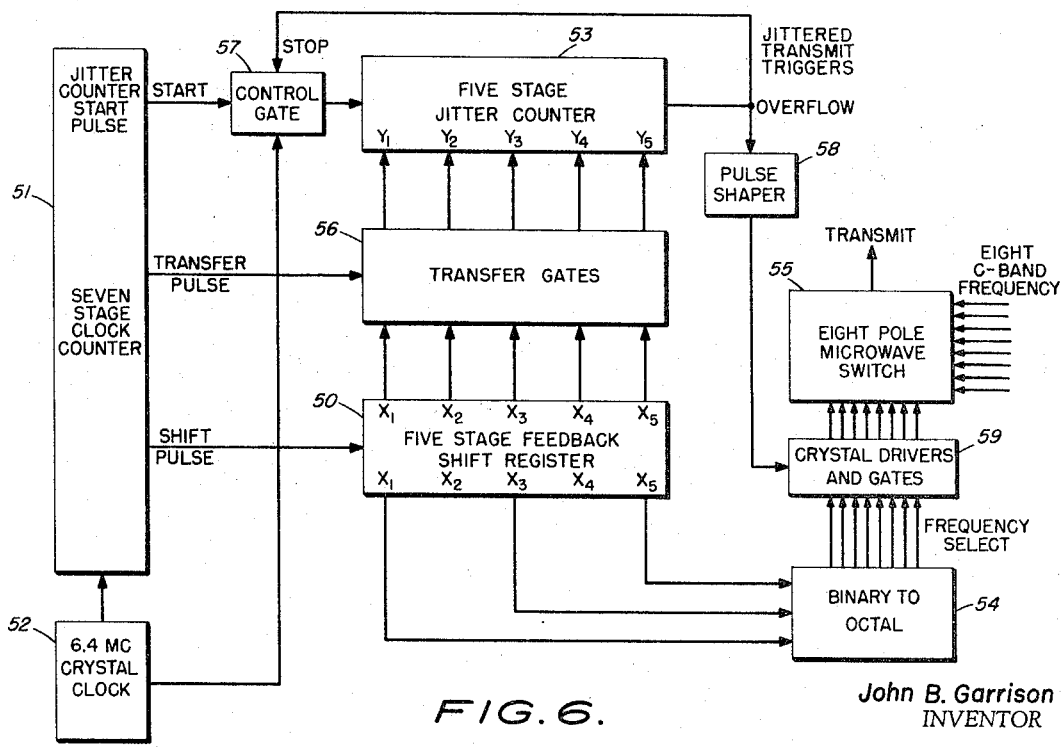
FIG. 6 shows a schematic block diagram of one form of programmed transmitter which may be used in conjunction with the invention.

The basic functions of the programmer shown in FIG. 6 are performed by a feedback shift register 50 which generates the preferred code, a clock counter 51 which controls the timing in response to a crystal clock 52, a jitter counter 53 which converts the code from the shift register 50 into a jitter which is imparted to the transmitted pulse, and a logic circuit, consisting of binary-to-octal converter 54 and microwave switch 55, which specifies one of eight frequencies to be transmitted according to the code in register 50.

Clock pulses derived from crystal clock 52 are applied to and counted by a seven stage clock counter 51 from which is derived a shift pulse, a clear pulse, a transfer pulse and a start pulse. In initiating operation of the system the shift pulse from clock counter 51 is applied to register 50 thereby advancing its state. The jitter counter 53 is cleared by a pulse from clock counter 51 and the transfer pulse opens a set of transfer gates 56 allowing each of the feedback shift register flip-flop outputs to set corresponding flip-flops in the five stage jitter counter 53. The start pulse then opens a control gate 57 which allows clock pulses from crystal clock 52 to fill the jitter counter 53 until an overflow pulse occurs. The overflow pulse is then applied on the one hand to control gate 57 thereby disconnecting the crystal clock 52 from jitter counter 53, and on the other hand through a pulse shaper 58 to an "and" gate 59 which applies the coded output of binary-to-octal converter 54 to the eight pole microwave switch 55, where a single transmission frequency is selected according to the applied code. The input to converter 54 is derived from the first, third and fifth flip-flops in shift register 50; therefore, each of the eight available frequencies will be repeated four times during the 32 pulse dwell time, but each of these pulses will have a different delay time associated therewith.

As is readily seen, the code is not transmitted directly but is used to pseudo-randomly space the fixed width transmit pulses and to pseudo-randomly vary the transmitted frequency from pulse to pulse. The selection of this type of transmit signal offers the advantages of reduced range ambiguity, elimination of Doppler blind spots which occur at multiples of the pulse repetition rate, and reduction of the time sidelobes in the incorrect Doppler channels. However, the use of a variable pulse repetition rate and pulse frequency will materially increase the complexity of the acquisition problem.

The coherent acquisition system which receives and processes the reflected programmed transmission, according to the invention is shown in FIG. 7. The principles and components illustrated and explained in conjunction with FIGS. 1 through 5 have been combined in the system of FIG. 7 to produce the preferred embodiment of the invention.

Incoming Doppler signals are picked up at antenna 60 and amplified in traveling wave amplifier 61 before being applied to an isolator 62 and a bandpass filter bank 63. The isolators 62 are used in several parts of the system to maintain a good voltage standing wave ratio, to minimize unwanted phase shifts, to preserve bandpass filter responses and to prevent crosstalk between channels resulting from modulation products generated in the mixers. The filter bank 63 consists of individual bandpass filter units which are each tuned to a different one of the eight transmitted frequencies and which are connected as two parallel sets with the bandpass of one set of filters offset from the other set so as to provide greater isolation between adjacent channels and to simplify the tuning problem.

The filter bank 63 has eight output channels which ultimately feed into the microwave matrix. For purposes of simplicity of explanation and ease of understanding, only one of these output channels is shown in FIG. 7. It is to be understood that each channel is identical to the one illustrated in the figure. The output of each bandpass filter in filter bank 63 is applied through an isolator 62 to a down mixer 64, where the microwave input signal is mixed down to a common IF level in each channel, and a preamplifier 65 where the amplitude of the signal is raised to a level suitable for further amplification in a driver amplifier 66.

The output of driver amplifier 66 is split into four sub-channels each of which contains an ultrasonic delay line 67. Each of the delay lines is set to have a delay corresponding to one of the four delays which the programmed code in the transmitter has assigned to the frequency of that particular channel. As mentioned in the above-referenced patent application of Nathanson and White, the frequency selecting signals in the programmer cycle in a coded manner through eight binary states, each occurring in a pseudo-random fashion four times in a dwell period. Each transmitted frequency will thus have only four possible delays associated with it; and so, by providing a sub-channel for each time delay that occurs in each channel, a sub-channel will be provided to the microwave matrix for each pulse delay created by the code. For purposes of clarity only one sub-channel is illustrated and described in connection with FIG. 7. It is to be understood that each sub-channel is identical to the one illustrated in the figure.

The output of each delay line 67 is amplified in post amplifier 68 and applied to an up mixer 69 where the delayed IF signal is reconverted to the microwave level. The local oscillator signals applied to the mixers 64 and 69 are derived from a stable frequency generator 70 which applies the stable local oscillator signal to a multicoupler 71 which is used to distribute the signal to the single down mixer 54 and the four up mixers 69. Each frequency channel will have a stable frequency generator for producing a given local oscillator signal and a multicoupler for distributing the signal to the mixers. The frequency of the local oscillator signal to be applied to a given channel will depend on the frequency of the channel alone, since for purposes of uniformity of response the IF frequency applied to each delay line 67 should be equal.

The output of up mixer 69 is applied via isolator 62 to a bandpass filter 72 which accepts the lower sideband output of the up mixer 69, rejecting the upper sideband and other modulation products. The output of filter 72 is then applied to microwave matrix 73 via variable phase shifter 74, which is used as a vernier to adjust the subchannel to an integral number of wavelengths. The microwave matrix 73 produces a pulse compression at one of its ten outputs in a manner already described in conjunction with FIG. 3. Each output of the matrix 73 is detected in a detector 75 and amplified in a viedo amplifier 76 and passed on to a data processing circuit for controlling other units within the weapons system.

It is thus seen that the invention provides a radar search and acquisition system which operates with frequency diversity, random pulse repetition rate, and pulse compression techniques, and which possesses extremely effective target discrimination capabilities with little or no ambiguities involved. The system is also diversified as to permit simple conversion from the search mode into track or track-while-scan.

Obviously many modifications and variations of the present invention are possible in the light of the above teachings. It is therefore to be understood that within the scope of the appended claims the invention may be practiced otherwise than as specifically described.

What is claimed is:

1. A pulse Doppler radar search and acquisition system comprising
   an antenna for receiving a plurality of pulses,
      each containing a Doppler component,
   a plurality of acquitision channels connected to said antenna,
   means for applying each input pulse to a different acquisition channel,
   delay means connected to each acquisition channel for applying to the pulse in each channel a delay which is proportional to the relative time of transmission of the pulse, and
   means for linearly delaying each pulse in varying increments which are proportional to the Doppler frequencies of the pulses of each channel.

2. A pulse Doppler radar search and acquisition system as defined in claim 1, wherein
   said received pulses are each of a different coherent frequency and
   said means for applying each pulse to a different channel consists of a bandpass filter bank having a separate bandpass filter for each acquisition channel.

3. A pulse Doppler radar search and acquisition system comprising
   antenna means for receiving a plurality of randomly spaced pulses each containing a Doppler component,
   a plurality of acquisition channels connected to said antenna,
   means for applying each input pulse to a different acquisition channel,
   delay means connected to each acquisition channel for applying to the pulse in each channel a delay which is proportional to the relative time of transmission of the pulse, and
   matrix means containing a plurality of inputs and a plurality of outputs and constructed with different delays between each input line and each output line such that the pulses appearing on all of the input lines will be compressed in only one of the output lines.

4. A pulse Doppler radar search and acquisition system as defined in claim 3, wherein said received pulses are each of a different coherent frequency, and said means for applying each pulse to a different channel consists of a bandpass filter bank having a separate bandpass filter for each acquisition channel.

5. A pulse Doppler radar search and acquisition system comprising antenna means for receiving a plurality of randomly spaced pulses each of a different coherent frequency and each containing a Doppler component, a separate acquisition channel connected to said antenna for each pulse frequency received, a bandpass filter connected in each acquisition channel for passing only those pulses received by the antenna which fall within the predetermined frequency band of the given channel, delay means connected to each acquisition channel for applying to the pulse in each channel a delay which is proportional to the relative time of transmission of the pulse, and matrix means for linearly delaying each pulse in varying increments which are proportional to the Doppler frequencies of the pulses of each channel.

6. A pulse Doppler radar search and acquisition system comprising an antenna for receiving a plurality of randomly spaced pulses, each pulse being of a different coherent frequency and containing a Doppler component, a plurality of bandpass filters connected to said antenna for passing those pulses received by the antenna which fall within the particular pass band of each filter, first mixing means connected to the output of each filter for beating the pulse frequencies down to a common intermediate frequency, a plurality of ultrasonic delay lines, each connected to one of said mixing means and each providing a delay to the pulse it receives, which delay is proportional to the relative time of transmission of the pulse, second mixing means connected to the output of each delay line for converting each pulse to its original microwave frequency, and matrix means containing a plurality of inputs and a plurality of outputs and constructed with different delays between each input line and each output line such that the pulses appearing on all of the input lines will be compressed in only one of the output lines.

7. A pulse Doppler radar search and acquisition system comprising an antenna for receiving a plurality of pulses each containing a Doppler component, a plurality of acquisition channels connected to said antenna, means for applying each input pulse to a different acquisition channel, delay means connected in each acquisition channel for applying to the pulse in each channel a delay which is proportional to the relative time of transmission of the pulse, and a matrix having a plurality of input lines, each connected to one of said acquisition channels, and a plurality of output lines, each coupled to said plurality of input lines such that the delay between couplings on a given output line is constant but the delay between couplings for different consecutive output lines varies in a linear fashion so that said train of pulses containing a Dopplyer shift will be compressed in only one of said output lines.

8. A pulse Doppler radar search and acquisition system as defined in claim 7, wherein said received pulses are each of a different coherent frequency, and said means for applying each pulse to a different channel consists of a bandpass filter bank having a separate filter for each acquisition channel.

9. A pulse Doppler radar search and acquisition system as defined in claim 8, wherein said delay means comprises a plurality of ultrasonic delay lines, each having a delay time which coincides with the relative time of transmission of one of said pulses which are at the designated frequency of the channel containing a delay line.

10. A frequency diversity pulse Doppler radar system comprising a transmitter capable of transmitting a train of pulses having a variable pulse repetition rate, each pulse being of a different coherent frequency, an antenna for receiving said transmitted pulsess after they are reflected by a target, means for delaying each pulse in proportion to the relative time of transmission of the pulse, and detection means for determining the Doppler frequency of said pulse train.

References Cited by the Examiner

UNITED STATES PATENTS 2,410,233  10/1946  Percival _____ 343—17.1

CHESTER L. JUSTUS, *Primary Examiner.*

R. D. BENNETT, *Assistant Examiner.*